United States Patent [19]

Holzer et al.

[11] Patent Number: 5,223,313

[45] Date of Patent: Jun. 29, 1993

[54] FIRE-RESISTANT GLAZING AND METHOD OF MAKING SAME

[75] Inventors: Gerhard Holzer; Udo Gelderie, both of Aachen, Fed. Rep. of Germany

[73] Assignee: Saint Gobain Vitrage International, Courbevoie, France

[21] Appl. No.: 643,491

[22] Filed: Jan. 22, 1991

[30] Foreign Application Priority Data

Jan. 22, 1990 [DE] Fed. Rep. of Germany ....... 4001677

[51] Int. Cl.⁵ .............................................. E06B 3/24
[52] U.S. Cl. .................................... 428/34; 428/192; 428/913; 428/920; 52/788; 52/789
[58] Field of Search .............. 428/34, 426, 913, 192, 428/76, 45, 920; 52/788–790, 232; 156/107, 109, 99

[56] References Cited

U.S. PATENT DOCUMENTS 4,830,913  5/1989  Ortmans et al. ...................... 428/34

FOREIGN PATENT DOCUMENTS 2713849  10/1977  Fed. Rep. of Germany .
3530968   3/1987  Fed. Rep. of Germany .
1541371   3/1977  United Kingdom .

Primary Examiner—Donald J. Loney
Attorney, Agent, or Firm—Oblon, Spivak, McClelland, Maier & Neustadt

[57] ABSTRACT

In a fire-resistant glazing consisting of at least two parallel glass panes held apart from one another, between which is disposed a layer of a hydrogel, the aqueous phase of which contains a dissolved salt, the solid phase of the hydrogel consists of the polymerized compound 2-hydroxy-3-methacryloxypropyltrimethylammonium chloride.

8 Claims, 1 Drawing Sheet

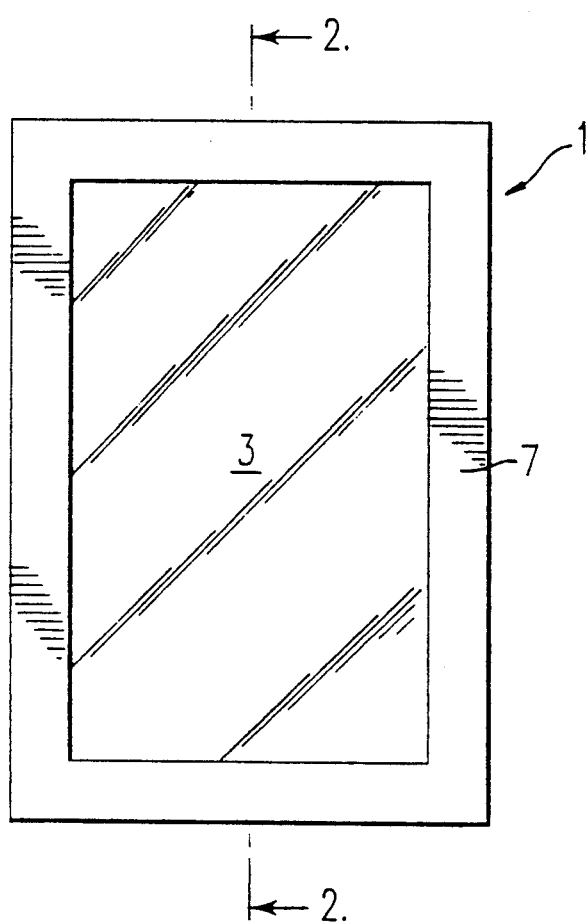
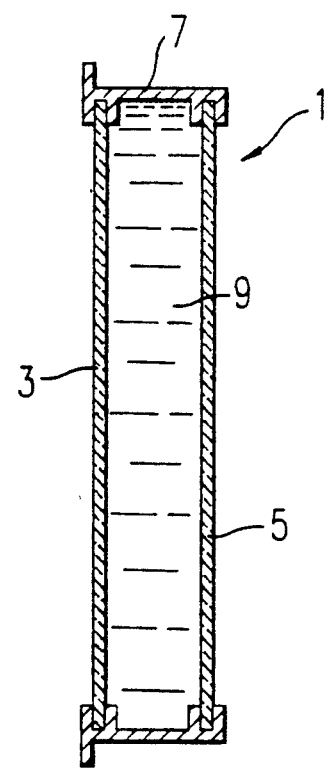
FIG. 1
FIG. 2

FIRE-RESISTANT GLAZING AND METHOD OF MAKING SAME

BACKGROUND OF THE INVENTION

1. Field of the Invention

This invention relates to a fire-resistant glazing consisting of at least two glass sheets held apart and parallel to one another between which is disposed a layer of a hydrogel, the aqueous phase of which contains a dissolved salt.

2. Description of the Prior Art

Fire-resistant glass panels of this type are known from DE 27 13 849 C2. Their method of functioning in case of fire consists in that, initially, the heat arising is absorbed by the water in the hydrogel layer and is consumed by evaporating the water, and that, after the water has been evaporated and after the solid organic phase of the hydrogel has been burnt, a solid, foam-like structure is formed from the salt. This foam-like solid structure is retained even under intense heat action and forms an insulating heat shield, which continues to impede the passage of the heat radiation. With this fundamental construction, fire-resistant glazings can be produced which satisfy the fire resistance classes G and the fire resistance classes F as defined in DIN 4102, part 5, of Sept. 1977.

In the known fire-resistant glass panels of the initially mentioned type, the polymer forming the solid phase of the hydrogel comprises a polyacrylamide, which is formed in aqueous solution by polymerization of methacrylamide and acrylamide. The polymerization takes place after the addition of peroxides or per-salts, with addition of an acceleration agent and, possibly, a cross-linking agent.

It is well known that acrylamide is a toxic compound, and its use for the production of fire-resistant glass panels is therefore not entirely harmless.

SUMMARY OF THE INVENTION

An object of the present invention is to find a system that polymerizes in aqueous solution, is a gel forming system, does not contain any toxic substances, is completely soluble in salt-containing water, will polymerize in the salt-containing water, and will form a colorless, unclouded gel.

According to this invention, this object, and others as will become apparent hereinafter, is achieved by the provision of a solid phase of the hydrogel consisting of the polymerized compound 2-hydroxy-3-methacryloxypropyltrimethylammonium chloride.

More particularly, the present invention provides, in a first embodiment, a hydrogel composition comprising: a solid phase comprising a polymer of 2-hydroxy-3-methacryloxypropyltrimethylammonium chloride; and an aqueous phase comprising a solution of water and a water-soluble salt.

In a further embodiment, the present invention provides a fire-resistant glazing panel comprising: a first glass sheet, having an outer peripheral edge; a second glass sheet having an outer peripheral edge, said first and second glass sheets being spaced apart from and parallel to one another to define an intermediate volume therebetween; and a hydrogel composition filling said intermediate volume between said first and second glass sheets, said hydrogel composition comprising a solid phase comprising a polymer of 2-hydroxy-3-methacryloxypropyltrimethylammonium chloride, and an aqueous phase comprising a solution of water and a water-soluble salt.

In a still further embodiment, the present invention provides a method of making a fire-resistant glazing panel comprising: providing a first glass sheet, having an outer peripheral edge; providing a second glass sheet, having an outer peripheral edge; disposing said first and second glass sheets spaced apart from and parallel to one another to define an intermediate volume therebetween; filling said intermediate volume with an aqueous polymerizable solution comprising 2-hydroxy-3-methacryloxypropyltrimethylammonium chloride; water and a water-soluble salt; and polymerizing said aqueous polymerizable solution to form a hydrogel.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

FIG. 1 is a front view of a fire-resistant glazing panel according to the present invention.

FIG. 2 is a cross-section of the fire-resistant glazing panel illustrated in FIG. 1, taken along line II—II.

DETAILED DESCRIPTION OF THE INVENTION

The monomeric compound 2-hydroxy-3-methacryloxypropyl-trimethylammonium-chloride, which forms the solid phase of the hydrogel by polymerization, has the structural formula

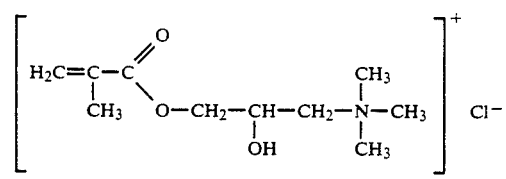

In respect of the compound used according to this invention, no toxicity and no effect adverse to health has so far been detected. Since this compound forms a stable, colorless, unclouded gel in the same manner as the acrylic acid derivatives hitherto known and used for this purpose, it is eminently suitable for the objective of the present invention. Compared with the acrylic acid derivatives known for this purpose, it furthermore has the advantage of an increased adhesion capability to the glass surface, so that special means for improving the bond of the gel to the glass sheets can be dispensed with.

As in the known fire-resistant glass panels, it is appropriate for the compound used according to this invention to be cross-linked three-dimensionally by addition of a cross-linking agent. Any cross-linking agent which is non-toxic and which allows the formation of a stable, colorless, unclouded gel may be used in the present invention. Typically, such cross-linking agents are used in an amount of about 0.1% to 1% by wt, based on the weight ⌒ of ⌒ 2-hydroxy-3-methacryloxypropyltrimethylammonium chloride, preferably in an amount of 0.1 to 0.6% by wt. As cross-linking agent, N-N' -methylene bisacrylamide (MBA) in particular may be used.

Any water-soluble salt which will remain soluble in the water of the aqueous phase under the normally expected conditions of use of the glazing panel, at the concentration levels specified hereinafter, may be used in the present invention. Such salts include aluminates, silicates, stannates, plumbates, borates, phosphates and halides and especially the alkali metal and ammonium salts thereof. Halides and especially sodium chloride (NaCl) are particularly preferred.

The catalyst systems used in the known fire-resistant glass panels, consisting of an oxidant and an accelerator component can be employed without difficulty for the polymerization of the compound used according to this invention. Typical oxidants include peroxides such as sodium peroxide sulphate ($Na_2S_2O_8$) and ammonium persulfate. Typical accelerators include diethyl aminopropionitrile (DEAPN) and triethanol amine in glycol (TEAG). However, any combination of oxidant and accelerator may be used which allows the formation of a stable, colorless, unclouded gel by polymerization at ambient temperature for about ½ to 10 hours, preferably in about ½ to 1 hour. Typically, the catalyst system is used in an amount of about 0.05 to 0.5% by wt., based on the weight of the aqueous polymerizable solution, preferably 0.1 to 0.3% by wt.

The proportionate quantity of polymer in the gel can vary over a relatively wide range and lies between 5% by wt. and 50% by wt. of the gel, preferably, between 10% by wt. and 40% by wt. of the gel, according to the requirements demanded for the fire-resistant glazing and consistency of the gel. The same is true from the other important constituents of the salt-containing hydrogel. Thus, the proportionate quantity of water may be from 50 to 90% by wt., preferably, 50 to 75% by wt., and the proportion of salt from 1 to 20% by wt., preferably, 10 to 15% by wt.

The production of the fire-resistant glazing takes place in known manner, in that firstly two glass panes are assembled together with a metal spacer frame of corrosion-resistant steel to form a hollow body. The cavity between is completely filled with the polymerizable gel-forming aqueous solution which, after filling, is polymerized and forms the gel.

As may best be seen in the drawing figures, the fire-resistant glazing panel, generally indicated at 1, comprises a first glass sheet 3 and a second glass sheet 5 which are engaged at their outer peripheral edges by a metal frame 7 so a to hold the first and second glass sheets in spaced apart parallel relationship to thereby define an intermediate volume 9 bounded by said first and second glass sheets and said metal frame.

The intermediate volume is completely filled with an aqueous polymerizable solution comprising: 5 to 50% by wt., preferably 10 to 40% by wt., based on said solution, ⊃ of⊂ 2-hydroxy-3-methacryloxypropyltrimethylammonium chloride; 50 to 90% by wt., preferably 50 to 75% by wt., based on said solution, of water; 1 to 20% by wt, preferably 10 to 15% by wt., based on said solution, of said water-soluble salt; the cross-linking agent, if desired; and the catalyst system; through an inlet port (not shown). If desired, the aqueous polymerizable solution may further include a corrosion inhibitor, such as tri-sodium phosphate ($Na_3PO_4$), as is known in the art. The aqueous polymerizable solution is preferably degassed, as by the application of vacuum pressure, prior to filling of the intermediate volume therewith (with care being taken not to reintroduce gas into the aqueous polymerizable solution during the filling of the intermediate volume). Polymerization is then allowed to proceed at ambient temperature, e.g., room temperature, to produce a fire-resistant glazing panel wherein the intermediate volume is completely filled with a clear, colorless, unclouded hydrogel.

The following examples are offered solely as being illustrative of the present invention, and in no way are intended to be limiting thereon.

EXAMPLE 1

400 g water
100 g NaCl
300 g 2-hydroxy-3-methacryloxypropyltrimethylammonium-chloride, and
0.5 g N-N'-methylene bisacrylamide are mixed together and the solution is degassed. The pH value of the solution is adjusted to 8.5. Thereafter, 0.6 g of triethanol amine in glycol (TEAG) and 0.4 g of sodium peroxide sulphate ($Na_2S_2O_8$) as catalyst system are added and stirred in. the solution obtained is filled into the cavity of the prepared glass panel. After 60 minutes, the solution has completely polymerized to form the hydrogel.

EXAMPLE 2

700 g water
130 g NaCl
170 g 2-hydroxy-3-methacryloxypropyltrimethylammonium-chloride, and
1 g N-N' -methylene bisacrylamide are mixed together and the solution is degassed. After the pH value has been adjusted to 9, 0.4 g of sodium peroxide sulphate ($Na_2S_2O_8$) and 0.6 g of triethanol amine in glycol are added as catalyst system and stirred in. The solution thus obtained is filled into the cavity of the panel. After 50 minutes, the solution has completely polymerized to form the hydrogel.

EXAMPLE 3

750 g water
150 g Nacl
120 g 2-hydroxy-3-methacryloxypropyltrimethylammonium-chloride,
0.5 g N-N' -methylene bisacrylamide and
2 g sodium phosphate, tribasic ($Na_3PO_4$)

are mixed together and the solution is degassed. The added tribasic sodium phosphate serves as corrosion inhibitor, if there should be a risk of corrosion of the metal space by the salt-containing gel. The pH value of the solution is adjusted to 9. Then 15 g of a 5% ammonium persulphate solution and 2 g of diethyl aminopropionitrile (DEAPN) are added as catalyst system and stirred in. The solution thus obtained is filled into the panel cavity. After 40 minutes, the solution is completely polymerized to form the hydrogel.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fire-resistant glazing panel comprising:
   a first glass sheet, having an outer peripheral edge;
   a second glass sheet, having an outer peripheral edge, said first and second glass sheets being spaced apart from and parallel to one another to define an intermediate volume therebetween; and a hydrogel composition filling said intermediate volume between said first and second glass sheets, said hydrogel composition comprising:

a solid phase comprising a polymer of 2-hydroxy-3-methacryloxypropyl-trimethylammonium chloride, and an aqueous phase comprising a solution of water and a water-soluble salt.

2. The fire-resistant glazing panel according to claim 1, wherein said fire-resistant glazing panel further comprises a frame member engaging said outer peripheral edge of said first glass sheet and said outer peripheral edge of said second glass sheet to maintain said first and second glass sheets in said spaced apart, parallel relationship.

3. The fire-resistant glazing panel according to claim 1, wherein said polymer is a cross-linked polymer.

4. The fire-resistant glazing panel according to claim 3, wherein said polymer is cross-linked with N,N'-methylene bisacrylamide.

5. The fire-resistant glazing panel according to claim 1, wherein said salt is sodium chloride.

6. The fire-resistant glazing panel according to claim 1, wherein said hydrogel comprises 5 to 50% by wt., based on said hydrogel, of said polymer of 2-hydroxy-3-methacryloxypropyltrimethylammonium chloride; 50 to 90% by wt., based on said hydrogel, of water; and 1 to 20% by wt., based on said hydrogel, of said water-soluble salt.

7. The fire-resistant glazing panel according to claim 6, wherein said hydrogel comprises 10 to 40% by wt., based on said hydrogel, of said polymer of 2-hydroxy-3methacryloxypropyltrimethylammonium chloride; 50 to 75% by wt., based on said hydrogel, of water; and 10 to 15% by wt., based on said hydrogel, of said water-soluble salt.

8. The fire-resistant glazing panel according to claim 1, wherein said aqueous phase further comprises a corrosion inhibitor.

* * * * *